Patented Apr. 6, 1954

2,674,630

UNITED STATES PATENT OFFICE 2,674,630

CRACKING FLUORINE COMPOUNDS

John D. Calfee, Dayton, Ohio, and Charles B. Miller, Lynbrook, N. Y., assignors to Allied Chemical & Dye Corporation, New York, N. Y., a corporation of New York No Drawing. Application August 3, 1951, Serial No. 240,291

4 Claims. (Cl. 260—653)

This invention relates to cracking of the compound, 1,1-difluorotetrachloroethane ($CCl_3CF_2Cl$) to produce other valuable fluorinated and chlorinated chemical compounds.

$CCl_3CClF_2$ may be formed by the simultaneous action of free chlorine and actinic light on ethylidene fluoride, $CH_3CHF_2$, at temperatures of about 400–550° C. as described in U. S. P. 2,469,290, issued May 3, 1949 to Calfee and Florio. The final product of the reaction of the patent, $CCl_3CClF_2$, is relatively stable, which for many purposes is a valuble property. However, in certain instances, it may be desired to convert the $CCl_3CClF_2$ to other materials, such as fluorochloromethanes, specifically difluorodichloromethane, $CCl_2F_2$, tetrachloroethylene, $CCl_2=CCl_2$ and carbon tetrachloride, $CCl_4$.

Hence, one object of the present invention is to develop a simple and economical procedure for converting $CCl_3CClF_2$ to other fluorinated and/or chlorinated products, such as fluorochloromethanes.

According to the present invention, realization of the foregoing objective is obtained by contacting gaseous material comprising 1,1-difluorotetrachloroethane with aluminum fluoride catalyst of type more fully described below, under conditions which bring about decomposition or cracking of the starting material to produce other halogenated products. By this catalytic contact process, $CCl_3CClF_2$ is converted to such valuable materials as $CCl_2F_2$, $CCl_2=CCl_2$ and $CCl_4$. Additional valuable products formed by side reactions may include small amounts of $CClF_3$, $CCl_3F$, $CCl_2=CF_2$, and $C_2Cl_3F_3$. In view of the nature of the reaction, the steps involved in the ultimate formation of the products obtained are probably complex, and although the exact reaction mechanism is not apparent the formation of the main products can be illustrated by

$$2CCl_3CClF_2 \rightarrow 2CCl_2F_2 + (CCl_2)_2$$

Any suitable aluminum fluoride, which at the time of use is substantially anhydrous, may be employed in the reaction. Such aluminum fluoride may be substantially pure; may be of so-called commercial or technical grade containing the usual impurities and made e. g. by reacting aqueous HF with aluminium oxide or hydrate and comprising lumps or particles which in turn are composed of $AlF_3$ crystals of relatively large size, i. e. not less than 1000 and usually several thousand Angstrom units radius and above; may be basic aluminum fluoride containing preferably at least about 95% $AlF_3$; or may be aluminum fluoride prepared by the reaction of $AlCl_3$ or other aluminum halide with liquid or gaseous fluorinating agent such as HF and comprising extremely small sub-microscopic crystals, i. e. "crystallites" which have crystal size below about 1000 Å. radius, ordinarily below about 500 Å. and preferably below about 200 Å., e. g. as made by the method more fully described in our copending application Serial No. 240,286, filed August 3, 1951, and directed to manufacture of

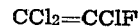

$$CCl_2=CClF$$

from $CCl_2=CCl_2$. Anhydrous aluminum fluorides which contain at least about 95% $AlF_3$, preferably at least about 98% $AlF_3$, ordinarily possess the desired catalytic activity. Raw commercial aluminum fluorides may contain certain amounts of water, e. g. water of hydration. In order to produce the anhydrous aluminum fluoride catalyst preferred for the purpose of the present invention, such water is removed by heating under conditions to completely dry the aluminum fluoride while preventing hydrolysis thereof, e. g. heating at about 450° C. until the bulk of the water is removed and thereafter further heating at above about 600° C. until residual amounts of water have been removed.

Reaction rate is appreciably affected by temperature and we find that in order to initiate and maintain the desired reaction to an appreciable extent, temperatures above about 550° C. should be maintained at the point of contact between aluminum fluoride catalyst and

$$CCl_3CClF_2$$

reactant. As temperature increases, rate of desired reaction also increases and particularly advantageous results are obtained at temperatures above about 650° C. Some of the desired decomposition or cracking of $CCl_3CClF_2$ occurs at temperatures as high as about 750° C. and above, but due to practical considerations of economy and difficulties of heating, temperatures above about 750° C. are ordinarily not utilized. At temperatures about 700° C. and below, optimum rate of decomposition is ordinarily obtained and hence this temperature is the upper limit of the preferred range.

Although not limited to continuous operations, the process of the invention is advantageously carried out thereby. Accordingly, particular procedure includes introducing gaseous $CCl_3CClF_2$ into a reaction zone containing aluminum fluoride catalyst, heating said $CCl_3CClF_2$ in the zone at the temperatures outlined above for a time sufficient to decompose an appreciable amount of reactant to form gaseous reaction product and withdrawing said product from the reaction zone. If desired, the catalyst may be used in the form of a fluidized solid bed in process gas in the reaction zone.

The time of contact between reactant and aluminum fluoride catalyst is a factor to be considered and controlled in obtaining desired degree of $CCl_3CClF_2$ decomposition. As rate of throughput of material through the reaction zone (space velocity) increases, time of contact of each increment of reactant gas with catalyst decreases, causing, generally, decrease in conversion. Space velocity of gaseous material passing through the reaction zone is controlled to obtain time of contact between reactant and catalyst sufficient to bring about the desired cracking of $CCl_3CClF_2$ and formation of sought-for fluorinated and chlorinated products. Although low space velocities and consequent long times of contact are generally favored by higher conversions, in the interest of obtaining higher reactor capacity and good economy of operation, time of contact is usually kept at a minimum (space velocity at a maximum) consistent with substantial conversion of $CCl_3CClF_2$ reactant. In a particular operation optimum rate of flow of feed material through the reaction zone is dependent upon variables such as scale of operation, quantity of catalyst in the reactor and the specific operation employed, and may be best determined by a test run.

Since the $CCl_3CClF_2$ starting material exists as a gas at reaction temperatures (boiling point 92° C.), if desired the pure $CCl_3CClF_2$ can be utilized as a reactant in the process of our invention and passed as substantially pure vapor over the aluminum fluoride catalyst to form other halogenated products as outlined above. However, in particular operations, it may be desired first to melt the $CCl_3CClF_2$ (melting point 40° C.) and pass an inert gas through the liquid to form gaseous material comprising $CCl_3CClF_2$ and inert gas which is subsequently introduced into the reaction zone. Needless to say, other gaseous material comprising $CCl_3CClF_2$ may be utilized as starting material in the reaction of the present invention, if such material is available. However, in most instances, particularly in the interest of facilitating recovery of sought-for halogenated materials from the gaseous reaction product mixture, it is preferred to utilize substantially pure $CCl_3CClF_2$ as reactant.

The reactor may be constructed of any suitable material capable of withstanding the reaction temperatures in the presence of reactants and products. Silica and graphite are examples of suitable materials, and metals which may be employed include nickel and inconel. A reactor of sufficient diameter to permit passage of the amount of material to be treated without undue pressure drop, and having sufficient length to accommodate the amount of aluminum fluoride catalyst required to effect the desired cracking is employed.

For convenience, atmospheric pressure operation is preferred. The reaction may, if desired, be carried out at super-atmospheric or sub-atmospheric pressure, the choice being largely one of convenience, e. g. determined by the nature of prior treatment of the starting material or subsequent treatment of the reaction product.

The various reaction products may be recovered separately or in admixture from the reaction zone exit gas stream in any suitable manner. The gas discharged from the reactor may be passed through a condenser and trap maintained at about 0° C. temperature initially to condense high boiling materials. $CCl_3CClF_2$ (B. P. plus 92° C.), $CCl_2=CCl_2$ (B. P. plus 122° C.) and $CCl_4$ (B. P. plus 77° C.) will be collected in this trap. Uncondensed gases such as $CCl_2F_2$ (B. P. minus 30° C.) and possibly certain amounts of $CClF_3$ (B. P. minus 81° C.) and $CCl_3F$ (B. P. plus 23.8° C.) leaving the first condenser may be scrubbed with caustic soda solution or soda lime to remove any possible traces of acidic material and then dried by means of anhydrous calcium chloride. The clean dried gas stream then may be introduced into a second condenser and trap, cooled with carbon dioxide ice and acetone and maintained at about minus 78° C. In this condenser, $CCl_2F_2$, $CClF_3$ and previously uncondensed amounts of higher boiling halocarbons are collected. The various products and unconsumed reactant may be recovered individually from the condensates indicated by fractional distillation under suitable conditions.

The following example illustrates practice of this invention, parts and percentages being by weight:

*Example*

400 parts of commercial aluminum fluoride catalyst containing 99% of $AlF_3$ and composed of particles in the size range 4 to 14 mesh were mounted in a horizontal ¾" I. D. and 4-feet-long silica tube fitted with a center thermocouple well for internal temperature measurement. The reactor was encased in an electrically heated furnace and provided with inlet and outlet tubes for passage of reactant and gaseous product, respectively. Liquid $CCl_3CClF_2$ was introduced into the inlet end of the reactor tube at the rate of about 100 parts per hour. The heat in the inlet end of the tube served to vaporize the liquid $CCl_3CClF_2$ feed, and reactant thereafter passed through the catalyst zone in the reactor while maintaining temperature in said zone in the range of about 650–700° C. Product gas was passed through a first condenser cooled with ice to condense high boilers, through a tower packed with soda lime and $CaCl_2$ to remove small amounts of free chlorine and acidic materials, and water, respectively, and into a condenser-trap cooled with Dry Ice and acetone to effect substantially total condensation. At the end of the run, reactant feed was discontinued and the condensate collected in the ice trap was heated to effect total vaporization thereof. These vapors were passed through the soda lime and $CaCl_2$ tower described above to effect removal of free chlorine and acidic constituents therefrom, and into the Dry Ice condenser. The combined condensates in the Dry Ice trap were subjected to fractionation to recover the individual materials, $CCl_2F_2$, $CCl_2=CCl_2$, $CCl_4$, and unreacted $CCl_3CClF_2$, and smaller amounts of $CClF_3$, $CCl_3F$, $CCl_2=CF_2$ and $CCl_2FCClF_2$. Of the $CCl_3CClF_2$ charged, conversion to all products was mol 30%. For each 100 mols of $CCl_3CClF_2$ charged, 20 mols of $CCl_2F_2$, 5 mols of $CCl_2FCClF_2$, and 5 mols total of $CClF_3$, $CCl_3F$ plus $CCl_2=CF_2$ were recovered. On the same basis, recoveries of $CCl_2=CCl_2$ and $CCl_4$ were 15 and 10 mols respectively.

We claim:

1. The process for forming a fluorochloromethane from $CCl_3CClF_2$ which comprises contacting gaseous material comprising said $CCl_3CClF_2$ with aluminum fluoride catalyst at temperature in the approximate range 550–750° C. for time sufficient to decompose a substantial amount of said $CCl_3CClF_2$ to form a substantial amount of said fluorochloromethane.

2. The process for cracking $CCl_3CClF_2$ to form $CCl_2F_2$ which comprises heating said $CCl_3CClF_2$ in the gas phase in the presence of aluminum fluoride catalyst at temperature in the approximate range 650–700° C. for time sufficient to crack a substantial amount of said $CCl_3CClF_2$ to form a substantial amount of $CCl_2F_2$.

3. The process which comprises introducing gaseous material comprising $CCl_3CClF_2$ into a reaction zone containing aluminum fluoride catalyst having not less than about 95% $AlF_3$ content, heating said material in said zone at temperature in the approximate range 550–750° C. for time sufficient to decompose a substantial amount of $CCl_3CClF_2$ to form gaseous reaction product containing a substantial amount of $CCl_2F_2$ and withdrawing said product from said zone.

4. The process for cracking $CCl_3CClF_2$ to form $CCl_2F_2$ which comprises introducing $CCl_3CClF_2$ in the gas phase into a reaction zone containing aluminum fluoride catalyst having not less than about 95% $AlF_3$ content, heating said $CCl_3CClF_2$ in said zone at temperature in the approximate range of 650–700° C. for time sufficient to crack a substantial amount of said $CCl_3CClF_2$ to form gaseous reaction product containing a substantial amount of $CCl_2F_2$, withdrawing said product from said zone and recovering said $CCl_2F_2$ from said product.

References Cited in the file of this patent

UNITED STATES PATENTS

| Number | Name | Date |
|---|---|---|
| 2,417,059 | Calfee et al. | Mar. 11, 1947 |
| 2,478,932 | Miller et al. | Aug. 16, 1949 |